US009112419B2

(12) United States Patent
Nate

(10) Patent No.: US 9,112,419 B2
(45) Date of Patent: Aug. 18, 2015

(54) AC/DC CONVERTER WITH CONTROL CIRCUIT THAT RECEIVES RECTIFIED VOLTAGE AT INPUT DETECTION TERMINAL

(71) Applicant: ROHM CO., LTD., Kyoto (JP)

(72) Inventor: Satoru Nate, Kyoto (JP)

(73) Assignee: ROHM CO., LTD. (JP)

( * ) Notice: Subject to any disclaimer, the term of this patent is extended or adjusted under 35 U.S.C. 154(b) by 0 days.

(21) Appl. No.: 14/328,064

(22) Filed: Jul. 10, 2014

(65) Prior Publication Data

US 2015/0023070 A1 Jan. 22, 2015

(30) Foreign Application Priority Data

Jul. 16, 2013 (JP) .................................. 2013-148014
Jul. 16, 2013 (JP) .................................. 2013-148015

(51) Int. Cl.
*H02M 3/335* (2006.01)
(52) U.S. Cl.
CPC .................................. *H02M 3/33507* (2013.01)
(58) Field of Classification Search
CPC .................. H02M 3/156; H02M 7/06; H02M 2001/0003; H02M 2001/0009; H02M 2001/0035; H02M 2001/322
USPC ........................... 363/16, 17, 20, 21.01–21.18
See application file for complete search history.

(56) References Cited

U.S. PATENT DOCUMENTS

| 4,344,122 | A  | * | 8/1982  | Jones ............................... 363/23 |
| 6,839,247 | B1 | * | 1/2005  | Yang et al. .................. 363/21.11 |
| 6,906,934 | B2 | * | 6/2005  | Yang et al. ....................... 363/49 |
| 8,305,047 | B2 | * | 11/2012 | Lin et al. ......................... 320/166 |
| 2002/0011825 | A1 | * | 1/2002 | Usui .............................. 323/222 |
| 2002/0126513 | A1 | * | 9/2002 | Negru et al. ...................... 363/25 |
| 2006/0125529 | A1 | * | 6/2006 | Laulanet et al. ................. 327/77 |
| 2007/0247879 | A1 | * | 10/2007 | Yang ............................... 363/49 |
| 2009/0290395 | A1 | * | 11/2009 | Osaka .......................... 363/126 |
| 2010/0123447 | A1 | * | 5/2010 | Vecera et al. .................. 323/290 |
| 2010/0188874 | A1 | * | 7/2010 | Sato et al. ................... 363/21.18 |
| 2010/0309694 | A1 | * | 12/2010 | Huang et al. .................... 363/49 |
| 2011/0038184 | A1 | * | 2/2011 | Sutardja et al. ............ 363/21.17 |
| 2011/0140630 | A1 | * | 6/2011 | Doudousakis et al. ....... 315/291 |
| 2011/0176341 | A1 | * | 7/2011 | Huang ............................ 363/49 |
| 2011/0249476 | A1 | * | 10/2011 | Chen et al. ....................... 363/52 |
| 2011/0305051 | A1 | * | 12/2011 | Yang et al. ....................... 363/49 |
| 2012/0195075 | A1 | * | 8/2012 | Nate ........................... 363/21.01 |
| 2013/0027999 | A1 | * | 1/2013 | Ptacek et al. .................. 363/126 |
| 2013/0076315 | A1 | * | 3/2013 | Liu et al. ........................ 320/166 |
| 2013/0170621 | A1 | * | 7/2013 | Saka et al. ..................... 378/104 |
| 2013/0235623 | A1 | * | 9/2013 | Huang ........................ 363/21.17 |
| 2013/0335038 | A1 | * | 12/2013 | Lee et al. ....................... 320/166 |
| 2014/0063875 | A1 | * | 3/2014 | Al-Shyoukh et al. ........... 363/49 |
| 2014/0160804 | A1 | * | 6/2014 | Sato et al. ................... 363/21.01 |
| 2014/0233283 | A1 | * | 8/2014 | Al-Shyoukh et al. ........... 363/49 |

* cited by examiner

*Primary Examiner* — Timothy J Dole
*Assistant Examiner* — Yusef Ahmed
(74) *Attorney, Agent, or Firm* — Cantor Colburn LLP

(57) ABSTRACT

A first rectified voltage obtained by rectifying an AC voltage is input to an input detection terminal of a control circuit. A first NMOS transistor configured as a depletion-type high-voltage element, and its drain is connected to the input detection terminal, and its gate is connected to its source. An AC voltage detection circuit detects the amplitude of the AC voltage based on a current that flows through the first NMOS transistor.

32 Claims, 11 Drawing Sheets

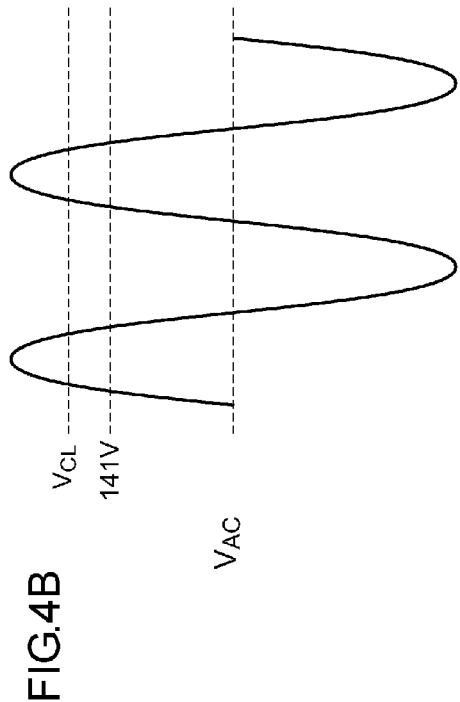
FIG.4A
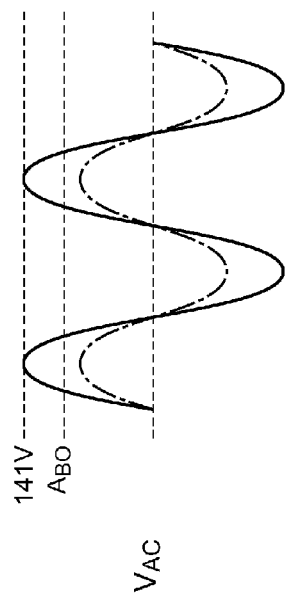
FIG.4B
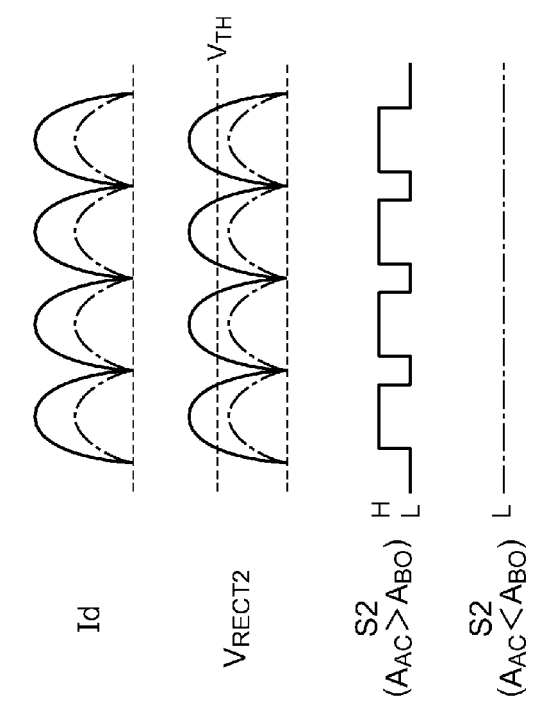

10a

US 9,112,419 B2

AC/DC CONVERTER WITH CONTROL CIRCUIT THAT RECEIVES RECTIFIED VOLTAGE AT INPUT DETECTION TERMINAL

CROSS REFERENCE TO RELATED APPLICATIONS

The present invention claims priority under 35 U.S.C. §119 to Japanese Applications No. 2013-148014 filed Jul. 16, 2013 and 2013-148015 filed Jul. 16, 2013, both of which is incorporated herein by reference.

BACKGROUND OF THE INVENTION

1. Field of the Invention

The present invention relates to an AC/DC converter.

2. Description of the Related Art

Various kinds of consumer electronics devices such as TVs, refrigerators etc., each receive externally applied commercial AC electric power for its operation. Also, electronic devices such as laptop computers, cellular phone terminals, and tablet PCs are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (converter) configured to perform AC/DC conversion of commercial AC voltage. Alternatively, such a converter is built into an external power supply adapter (AC adapter) for such an electronic device.

FIG. 1 is a block diagram showing an AC/DC converter 1r investigated by the present inventor. The AC/DC converter 1r mainly includes a fuse 2, an input capacitor Ci, a filter 3, a first rectifier circuit 4, a smoothing capacitor Cs, and a DC/DC converter 6r.

The commercial AC voltage $V_{AC}$ is input to the filter 3 via the fuse 2 and the input capacitor Ci. The filter 3 removes noise included in the commercial AC voltage $V_{AC}$. The first rectifier circuit 4 is configured as a diode bridge circuit which performs full-wave rectification of the commercial AC voltage $V_{AC}$. The output voltage of the first rectifier circuit 4 is smoothed by the smoothing capacitor Cs, thereby generating a converted DC voltage $V_{DC}$.

An insulated DC/DC converter 6r receives the DC voltage $V_{DC}$ via an input terminal P1, steps down the DC voltage $V_{DC}$ thus received, and supplies an output voltage $V_{OUT}$ stabilized to the target value to a load (not shown) connected to an output terminal P2.

The DC/DC converter 6r includes a control circuit 10r, an output circuit 7, and a feedback circuit 8. The output circuit 7 includes a transformer T1, a first diode D1, and a first output capacitor Co1. The feedback circuit 8 generates a feedback voltage $V_{FB}$ that corresponds to the output voltage $V_{OUT}$, and supplies the feedback voltage $V_{FB}$ thus generated to a feedback terminal (FB terminal) of the control circuit 10r.

The control circuit 10r includes a switching transistor M1, a driving circuit 20, a starter circuit 30, a clamp circuit 40, and an AC voltage detection circuit 50.

A drain (DRAIN) terminal of the control circuit 10r is connected to a primary winding W1. The source (SOURCE) terminal of the control circuit 10r is connected to an external detection resistor Rs. The switching transistor M1 is arranged between the DRAIN terminal and the SOURCE terminal. The driving circuit 20 switches on and off the switching transistor M1 according to the feedback voltage $V_{FB}$.

The switching transistor M1 is switched on and off so as to step down the input voltage $V_{DC}$, thereby generating the output voltage $V_{OUT}$. The control circuit 10r adjusts the duty ratio of the switching operation of the switching transistor M1 so as to stabilize the output voltage $V_{OUT}$ to a target value, and to control the coil current Ip that flows through the primary winding W1 of the transformer T1.

The detection resistor Rs is arranged in series between the primary winding W1 of the transformer T1 and the switching transistor M1. A voltage drop (detection voltage) $V_{CS}$ is produced across the detection resistor Rs in proportion to the current Ip that flows through the primary winding W1 and the switching transistor M1. The control circuit 10r controls, based on the detection voltage $V_{CS}$, the current Ip that flows through the primary winding W1.

A second diode D2 and a second output capacitor Co2 are connected to an auxiliary coil W3 of the transformer T1. A DC voltage $V_{CC}$ is produced across the second output capacitor Co2 according to the switching of the switching transistor M1. The DC voltage $V_{CC}$ thus generated is supplied to a power supply (VCC) terminal of the control circuit 10r.

An internal circuit of the control circuit 10r such as the driving circuit 20 operates receiving the power supply voltage $V_{CC}$ generated at the VCC terminal. Before the startup of the DC/DC converter 6r, the power supply voltage $V_{CC}$ is zero. Thus, the control circuit 10r cannot start up using the power supply voltage $V_{CC}$. In order to solve such a problem, the control circuit 10r includes a starter circuit 30 arranged between the DRAIN terminal and the VCC terminal. Before the start of the switching of the switching transistor M1 of the DC/DC converter 6r in the startup operation of the DC/DC converter 6r, the starter circuit 30 charges the second output capacitor Co2 connected to the VCC terminal using the input voltage $V_{DC}$ supplied via the primary winding W1. Thus, such an arrangement is capable of raising the power supply voltage $V_{CC}$ to a voltage level required to operate the control circuit 10r before the start of switching of the switching transistor M1.

In some cases, the voltage $V_{CC}$ at the VCC terminal becomes excessively high due to the charging of the starter circuit 30. The clamp circuit 40 clamps the voltage $V_{CC}$ of the VCC terminal such that it is equal to or lower than a predetermined upper limit voltage (e.g., 12 V). The clamp circuit 40 supplies the voltage $V_{CC}$ thus clamped to the internal circuits such as the driving circuit 20.

The AC/DC converter 1r is used in various kinds of environments. In some cases, the AC voltage $V_{AC}$ input to the AC/DC converter 1r is higher than the rated value or otherwise is lower than the rated value. If the DC/DC converter 6r is operated in such a situation in which the AC voltage $V_{AC}$ is outside the rated range, this leads to defective operation of the DC/DC converter 6r.

In order to solve such a problem, the control circuit 10r is configured to have a function of monitoring the AC voltage $V_{AC}$. A second rectifier circuit 9 performs full-wave rectification of the commercial AC voltage $V_{AC}$. In some cases, the first rectified voltage $V_{RECT}$ generated by the second rectifier circuit 9 is higher than several hundreds of V. In this case, the first rectified voltage $V_{RECT}$ having such a high value cannot be input as it is to the control circuit 10r. In order to solve such a problem, the first rectified voltage $V_{RECT}$ is divided by means of resistors R11 and R12, and the voltage $V_{IN}$ thus divided is input to the input (VIN) terminal of the control circuit 10r.

The AC voltage detection circuit 50 detects whether or not the amplitude $A_{AC}$ of the AC voltage $V_{AC}$ is within a predetermined range based on the second rectified voltage $V_{IN}$ at the VIN terminal. More specifically, when the amplitude $A_{AC}$ of the AC voltage $V_{AC}$ is lower than a threshold amplitude $A_{BO}$, the AC voltage detection circuit 50 stops the operation of the DC/DC converter 6r. This function is also referred to as "a low AC input voltage protection (brownout protection) function". Furthermore, when the amplitude of the AC voltage $V_{AC}$ becomes higher than the threshold amplitude $A_{BO}$, the operation of the DC/DC converter 6r is resumed (brown-in function).

There are capacitance components such as a capacitor Ci between the positive electrode terminal and the negative electrode terminal across which the AC voltage $V_{AC}$ is to be input. After the AC/DC converter 1r is unplugged from an electrical outlet, a charge remains in the capacitance components. As a result, the DC voltage $V_{DC}$ does not immediately become zero. However, after the AC/DC converter 1r is unplugged from an electrical outlet, the AC/DC converter 1r employed in a power supply adapter or an electronic device is required to reduce the voltage across the positive electrode terminal and the negative electrode terminal to a predetermined voltage or less in a predetermined period of time. In order to meet this requirement, a discharging resistor Rdis is provided to the AC/DC converter 1r shown in FIG. 1 such that it is arranged between the positive electrode terminal and the negative electrode terminal.

The inventor has investigated the AC/DC converter 1r shown in FIG. 1, and has come to recognize the following problems.

In order to monitor the AC voltage $V_{AC}$, the AC/DC converter 1r shown in FIG. 1 requires high-voltage resistors R11 and R12 each arranged as an external component of the control circuit 10r. Such an external resistor element leads to a problem of a high cost. Furthermore, such an arrangement requires an additional mounting area, which is also a problem.

SUMMARY OF THE INVENTION

The present invention has been made in order to solve such a problem. Accordingly, it is an exemplary purpose of an embodiment of the present invention to provide an AC/DC converter and a control circuit for the AC/DC converter configured to operate without such an external resistor.

1. An embodiment of the present invention relates to a control circuit used for an AC/DC converter configured to convert an AC voltage into a first DC voltage. The AC/DC converter comprises: a first rectifier circuit configured to rectify and smooth the AC voltage so as to convert the AC voltage into a second DC voltage; an insulating DC/DC converter configured to step up or otherwise step down the second DC voltage; and a feedback circuit configured to generate a feedback voltage that corresponds to the first DC voltage. The control circuit comprises: an input detection terminal via which a first rectified voltage obtained by rectifying the AC voltage is input; a power supply terminal connected to an external capacitor, and configured to receive a third DC voltage generated on a primary side of a transformer of the DC/DC converter in an operating state of the DC/DC converter; a feedback terminal coupled to receive the feedback voltage; a depletion-type high-voltage first NMOS transistor arranged such that its drain is connected to the input detection terminal, and its gate is connected to its source; an AC voltage detection circuit including a first resistor and a second resistor arranged in series between the source of the first NMOS transistor and a ground line, and configured to detect an amplitude of the AC voltage based on a second rectified voltage that develops at a connection node that connects the first resistor and the second resistor; a starter circuit arranged between the input detection terminal and the power supply terminal, and configured to charge the capacitor connected to the power supply terminal using the first rectified voltage in a startup operation of the AC/DC converter; and a driving circuit configured to receive a voltage at the power supply terminal as its operating voltage, and to drive a switching transistor of the DC/DC converter according to the feedback voltage. The control circuit is monolithically integrated on a single semiconductor substrate.

There is a possibility that a high voltage of several hundreds of V could be applied to the input detection terminal. With such an arrangement in which the first NMOS transistor configured as a high-voltage depletion-type transistor is connected to the input detection terminal, a current that flows via the first NMOS transistor, the first resistor, and the second resistor is limited to the vicinity of the predetermined maximum current $I_{MAX}$. This allows the voltage across both terminals of a circuit comprising the first resister and the second resister, i.e., the source voltage Vs of the first NMOS transistor, to be clamped in the vicinity of $V_{MAX}=(R1+R2) \times I_{MAX}$. That is to say, such an arrangement protects the first resistor R1 and the second resistor R2 from the application of a high voltage that exceeds $V_{MAX}$. Such an embodiment allows the first resistor R1 and the second resistor R2 to be configured to have a low breakdown voltage. Thus, the first resistor R1 and the second resistor R2 can each be configured as an element formed in a semiconductor substrate. This allows the number of such external resistors to be reduced.

Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate in order to adjust the circuit constants. By integrating such a control circuit in the form of a single IC (Integrated Circuit), such an arrangement provides a reduced circuit area while maintaining improved uniformity of the circuit element characteristics.

Also, the control circuit according to an embodiment may further comprise a third resistor arranged between the source of the first NMOS transistor and the AC voltage detection circuit. Also, the gate of the first NMOS transistor may be connected to a connection node that connects the source and the first resistor.

With such an embodiment, the temperature characteristics of the first NMOS transistor can be canceled out, thereby stabilizing the source voltage of the first NMOS transistor.

Also, the control circuit according to an embodiment may further comprise a discharge transistor arranged between the power supply terminal and a ground line.

With such an embodiment, after the AC/DC converter is unplugged, the discharge transistor is turned on, thereby discharging the capacitance that had formed between the positive electrode and the negative electrode. Such an arrangement does not require an external discharge resistor, thereby providing a reduced cost.

Also, the starter circuit may comprise a second NMOS transistor configured as a high-voltage transistor and a gate control circuit configured to control the gate of the second NMOS transistor. Also, the second NMOS transistor may be configured as a depletion-type transistor, and has its source and its back gate connected together.

Also, the AC voltage detection circuit may comprise: a comparator configured to compare the second rectified voltage with a predetermined threshold voltage, and to generate a comparison signal which indicates a comparison result; and a logic unit configured to judge, based on the comparison signal, a magnitude relation between the amplitude of the AC voltage and a threshold amplitude that corresponds to the threshold voltage.

Also, when the comparison signal remains at a constant level over a predetermined number of cycles of the AC voltage, the logic unit may judge that the amplitude of the AC voltage is smaller than the threshold amplitude.

Such an embodiment is capable of detecting a brief voltage abnormality which remains over several cycles of the AC frequency.

Also, when the amplitude of the AC voltage is smaller than the threshold amplitude, which is set to a value that is lower than a rated amplitude, the AC voltage detection circuit may suspend the operation of the DC/DC converter.

Also, the size of the first NMOS transistor and the resistance values of the first resistor and the second resistor may be determined such that the first NMOS transistor operates in its linear range when the amplitude of the AC voltage is within a detection range.

Also, the threshold voltage may be provided with hysteresis.

Another embodiment of the present invention relates to an AC/DC converter configured to convert an AC voltage into a first DC voltage. The AC/DC converter comprises: a first rectifier circuit configured to rectify and smooth the AC voltage so as to convert the AC voltage into a second DC voltage; an insulating DC/DC converter configured to step up or otherwise step down the second DC voltage; a second rectifier circuit configured to rectify the AC voltage so as to generate a first rectified voltage; a transformer comprising a primary winding and an auxiliary winding provided on its primary side, and a secondary winding provided on its secondary side; a switching transistor connected to the primary winding of the transformer; a first diode having its anode connected to the secondary winding; a first output capacitor having its one end grounded, and its other end connected to a cathode of the first diode; a second diode having its anode connected to the auxiliary winding; a second output capacitor having its one end grounded, and its other end connected to a cathode of the second diode; a feedback circuit configured to generate a feedback voltage that corresponds to the first DC voltage generated at the first output capacitor; and any one of the control circuits described above. The control circuit is arranged such that the second DC voltage is input to its input detection terminal, the second DC voltage generated at the second output capacitor is supplied to its power supply terminal, and the feedback voltage is input to its feedback terminal.

Also, the feedback circuit may comprise: a shunt regulator configured to generate a feedback signal having a level adjusted such that the difference between a voltage obtained by dividing the first DC voltage and a predetermined target value becomes zero; and a photocoupler comprising a primary-side light-emitting element which is controlled according to the feedback signal. Also, a signal generated by a light-emitting element provided on the secondary side of the photocoupler may be supplied to the control circuit as the feedback voltage.

Also, the AC/DC converter may further comprise a filter configured to perform filtering of the AC voltage. Also, the second rectifier circuit may be configured to rectify the AC voltage after the AC voltage is subjected to the filtering.

2. An embodiment of the present invention relates to a control circuit used for an AC/DC converter configured to convert an AC voltage into a first DC voltage. The AC/DC converter comprises: a first rectifier circuit configured to rectify and smooth the AC voltage so as to convert the AC voltage into a second DC voltage; an insulating DC/DC converter configured to step up or otherwise step down the second DC voltage; and a feedback circuit configured to generate a feedback voltage that corresponds to the first DC voltage. The control circuit comprises: an input detection terminal via which a first rectified voltage obtained by performing full-wave rectification of the AC voltage is input; a power supply terminal connected to an external capacitor, and configured to receive a third DC voltage generated on a primary side of a transformer of the DC/DC converter in an operating state of the DC/DC converter; a feedback terminal coupled to receive the feedback voltage; a first NMOS transistor configured as a depletion-type high-voltage transistor having its drain connected to the input detection terminal and its gate connected to its source; an AC voltage detection circuit configured to detect the amplitude of the AC voltage based on a current that flows through the first NMOS transistor; a starter circuit arranged between the input detection terminal and the power supply terminal, and comprising a path which allows the capacitor connected to the power supply terminal to be charged using the first rectified voltage; and a driving circuit configured to receive a voltage at the power supply terminal as its operating voltage, and to drive a switching transistor of the DC/DC converter according to the feedback voltage. The control circuit is monolithically integrated on a single semiconductor substrate.

There is a possibility that a high voltage of several hundreds of V could be applied to the input detection terminal. With such an arrangement in which the first NMOS transistor configured as a high-voltage depletion-type transistor is connected to the input detection terminal, a current that flows from the first NMOS transistor to the AC voltage detection circuit is limited to the vicinity of the predetermined maximum current $I_{MAX}$. By setting the maximum current $I_{MAX}$ to a small value, such an arrangement is capable of preventing overvoltage from occurring in the AC voltage detection circuit. Such an embodiment allows the number of external resistors to be reduced.

Also, the AC voltage detection circuit may be configured to convert a current that flows through the first NMOS transistor into a voltage, and to detect the amplitude of the AC voltage based on the aforementioned voltage.

Also, the AC voltage detection circuit may comprise: a current mirror circuit comprising a third transistor arranged between the source of the first NMOS transistor and a ground line, and a fourth transistor configured to generate a current having a current value obtained by multiplying a current that flows through the third transistor by a predetermined coefficient; and a converter resistor arranged on a current path of a current that flows through the fourth transistor such that its one end is set to a fixed electric potential. Also, the AC voltage detection circuit may be configured to detect the amplitude of the AC voltage based on an inverted rectified voltage that occurs at the other end of the converter resistor.

Also, the control circuit according to an embodiment may further comprise a third resistor arranged between the source of the first NMOS transistor and the AC voltage detection circuit. Also, the gate of the first NMOS transistor may be connected to a connection node that connects the source and the AC voltage detection circuit.

With such an embodiment, the temperature characteristics of the first NMOS transistor can be canceled out, thereby stabilizing the source voltage of the first NMOS transistor.

Also, the control circuit according to an embodiment may further comprise a discharge transistor arranged between the power supply terminal and a ground line.

With such an embodiment, after the AC/DC converter is unplugged, the discharge transistor is turned on, thereby discharging the capacitance that had formed between the positive electrode and the negative electrode. Such an arrangement does not require an external discharge resistor, thereby providing a reduced cost.

Also, the starter circuit may comprise a second NMOS transistor configured as a high-voltage transistor and a gate control circuit configured to control the gate of the second NMOS transistor. Also, the second NMOS transistor may be configured as a depletion-type transistor, and has its source and its back gate connected together.

Also, the AC voltage detection circuit may comprise: a comparator configured to compare the inverted rectified voltage with a predetermined threshold voltage, and to generate a comparison signal which indicates a comparison result; and a logic unit configured to judge, based on the comparison signal, a magnitude relation between the amplitude of the AC voltage and a threshold amplitude that corresponds to the threshold voltage.

Also, when the comparison signal remains at a constant level over a predetermined number of cycles of the AC voltage, the logic unit may judge that the amplitude of the AC voltage is greater than the threshold amplitude.

Also, when the amplitude of the AC voltage is smaller than the threshold amplitude, which is set to a value that is lower than a rated amplitude, the AC voltage detection circuit may suspend the operation of the DC/DC converter.

Also, the size of the first NMOS transistor and the size of the third transistor may be determined such that the first NMOS transistor operates in a saturation range when the amplitude of the AC voltage is within a detection range.

Also, the threshold voltage may be provided with hysteresis.

Yet another embodiment of the present invention relates to an AC/DC converter configured to convert an AC voltage into a first DC voltage. The AC/DC converter comprises: a first rectifier circuit configured to rectify and smooth the AC voltage so as to convert the AC voltage into a second DC voltage; an insulating DC/DC converter configured to step up or otherwise step down the second DC voltage; a second rectifier circuit configured to rectify the AC voltage so as to generate a first rectified voltage; a transformer comprising a primary winding and an auxiliary winding provided on its primary side, and a secondary winding provided on its secondary side; a switching transistor connected to the primary winding of the transformer; a first diode having its anode connected to the secondary winding; a first output capacitor having its one end grounded and its other end connected to a cathode of the first diode; a second diode having its anode connected to the auxiliary winding; a second output capacitor having its one end grounded and its other end connected to a cathode of the second diode; a feedback circuit configured to generate a feedback voltage that corresponds to the first DC voltage generated at the first output capacitor; and any one of the aforementioned control circuits. The control circuit is arranged such that the second DC voltage is input to its input detection terminal, the second DC voltage generated at the second output capacitor is supplied to its power supply terminal, and the feedback voltage is input to its feedback terminal.

Also, the feedback circuit may comprise: a shunt regulator configured to generate a feedback signal having a level adjusted such that the difference between a voltage obtained by dividing the first DC voltage and a predetermined target value becomes zero; and a photocoupler comprising a primary-side light-emitting element which is controlled according to the feedback signal. Also, a signal generated by a light-emitting element provided on the secondary side of the photocoupler may be supplied to the control circuit as the feedback voltage.

Also, the AC/DC converter may further comprise a filter configured to perform filtering of the AC voltage. Also, the second rectifier circuit may be configured to rectify the AC voltage after the AC voltage is subjected to the filtering.

3. Yet another embodiment of the present invention relates to an electronic device. The electronic device comprises: a load; and any one of the aforementioned AC/DC converter configured to supply the first DC voltage to the load.

4. Yet another embodiment of the present invention relates to a power supply adapter. The power supply adapter comprises any one of the aforementioned AC/DC converters.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A and 4B are operation waveform diagrams each showing the operation of the AC/DC converter shown in FIG. 2;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

First Embodiment

Figure 1:
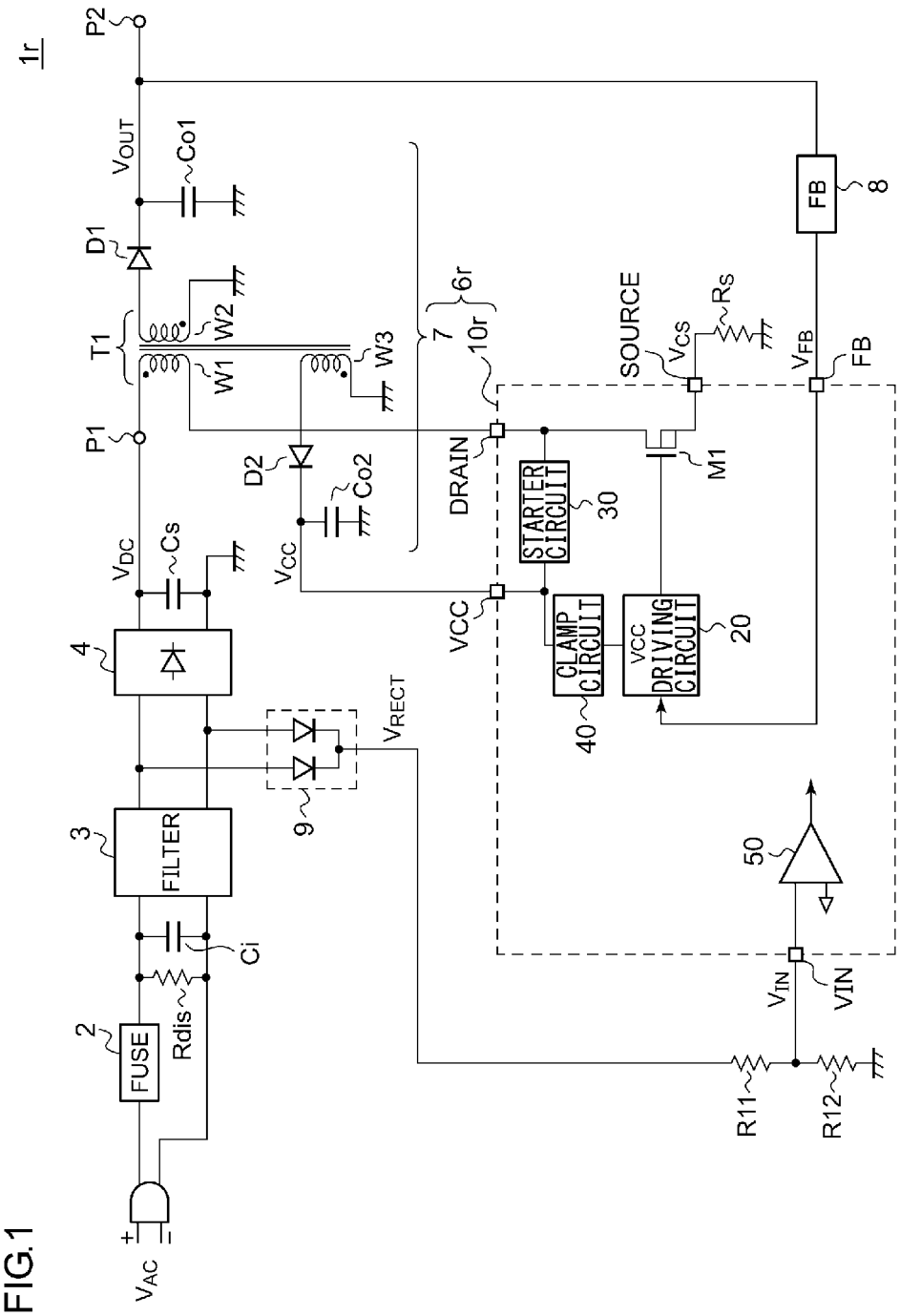
FIG. 1 is a block diagram showing an AC/DC converter investigated by the present inventor.
Figure 2:
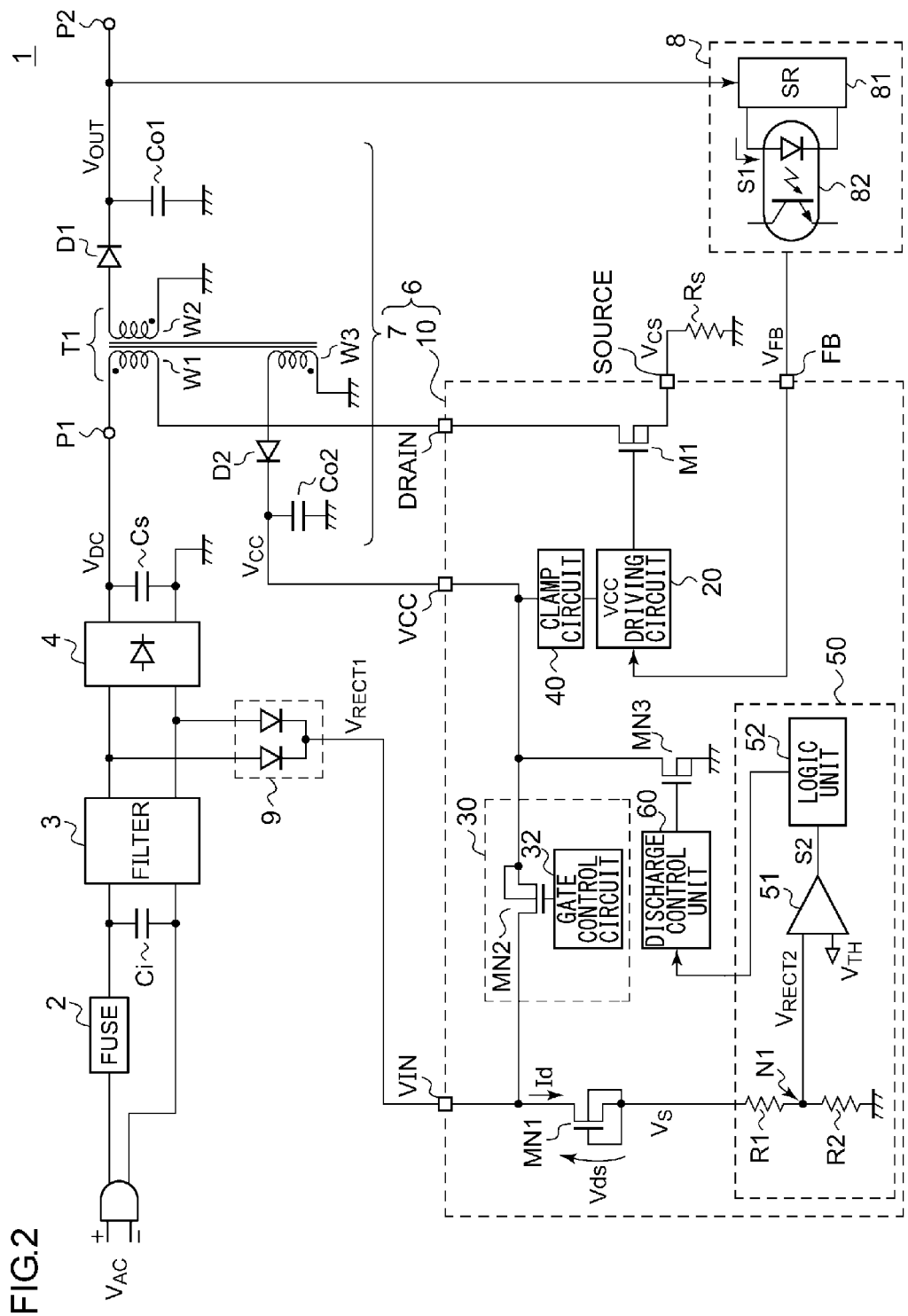
FIG. 2 is a circuit diagram showing an AC/DC converter including a control circuit according to a first embodiment.

FIG. 2 is a circuit diagram showing an AC/DC converter 1 including a control circuit 10 according to a first embodiment. The AC/DC converter 1 converts an AC voltage $V_{AC}$ into a first DC voltage $V_{OUT}$. The AC/DC converter 1 has the same basic configuration as that of the AC/DC converter 1r shown in FIG. 1. Accordingly, description will be made below focusing on the points of difference between them.

A feedback circuit 8 generates a feedback voltage $V_{FB}$ that corresponds to the first DC voltage $V_{OUT}$. For example, the feedback circuit 8 includes a shunt regulator 81 and a photocoupler 82. The shunt regulator 81 generates a feedback signal S1 having a level adjusted such that the difference between a voltage obtained by dividing the first DC voltage $V_{OUT}$ and a predetermined target value $V_{REF}$ becomes zero. In the photocoupler 82, a light-emitting element provided on the primary side is controlled according to the feedback signal S1. Furthermore, a signal generated by a light-receiving element provided on the secondary side of the photocoupler 82 is input to an FB terminal of the control circuit 10 as the feedback voltage $V_{FB}$.

Description will be made regarding a specific configuration of the control circuit 10.

A second rectifier circuit 9 rectifies the AC voltage $V_{AC}$, and more specifically, the AC voltage $V_{AC}$ after it passes through a filter 3, thereby generating a first rectified voltage $V_{RECT1}$. The first rectified voltage $V_{RECT1}$ is input to an input detection terminal VIN of the control circuit 10.

An external second output capacitor Co2 is connected to a VCC terminal. In the operating state of a DC/DC converter 6, a third DC voltage (which will also be referred to as the "power supply voltage") $V_{CC}$ generated on the primary side of the transformer T1 of the DC/DC converter 6 is supplied to the VCC terminal.

The control circuit 10 includes a switching transistor M1, a driving circuit 20, a starter circuit 30, a clamp circuit 40, a first NMOS transistor MN1, an AC voltage detection circuit 50, a discharge transistor MN3, and a discharge control unit 60, which are monolithically integrated on a single semiconductor substrate.

Description has already been made regarding the switching transistor M1, the driving circuit 20, and the clamp circuit 40. It should be noted that the configurations of the driving circuit 20 and the clamp circuit 40 are not restricted in particular. Also, the driving circuit 20 and the clamp circuit 40 may have known circuit configurations. The driving circuit 20 may include a peak current mode modulator or otherwise an average current mode modulator.

The first NMOS transistor MN1 is configured as a high-voltage depletion-type transistor. The term "high-voltage transistor" represents a transistor having a breakdown voltage that is higher than the maximum voltage which can be applied to the input detection terminal VIN. With a rated AC voltage $V_{AC}$ of 100 V, a peak voltage on the order of 140 V is applied to the input detection terminal VIN. In addition, a high voltage on the order of 700 V is potentially applied to the input detection terminal VIN due to temporary fluctuation in the AC voltage $V_{AC}$. In this case, the first NMOS transistor MN1 is configured as a transistor element having a breakdown voltage of 700 V. Such a high-voltage transistor element may have a device configuration using known techniques. Accordingly, description thereof will be omitted.

The first NMOS transistor MN1 is arranged such that its drain is connected to the input detection terminal VIN, and its gate is connected to its source. Furthermore, the back gate of the first NMOS transistor MN1 is connected to its source.

The AC voltage detection circuit 50 includes a first resistor R1 and a second resistor R2 arranged in series between the source of the first NMOS transistor MN1 and the ground line. The source voltage Vs of the first NMOS transistor MN1 is divided by means of the first resistor R1 and the second resistor R2. The AC voltage detection circuit 50 detects the amplitude $A_{AC}$ of the AC voltage $V_{AC}$ based on the second rectified voltage $V_{RECT2}$ that develops at a connection node N1 that connects the first resistor R1 and the second resistor R2.

With the present embodiment, the AC voltage detection circuit 50 is used to provide a brown-in function and a brown-out function. Specifically, the AC voltage detection circuit 50 judges, based on the second rectified voltage $V_{RECT2}$, a magnitude relation between the amplitude $A_{AC}$ of the AC voltage $V_{AC}$ and a predetermined threshold amplitude $A_{BO}$. When $A_{AC}<A_{BO}$, the brownout operation is performed. Conversely, when $A_{AC}>A_{BO}$, the brown-in operation is performed. In a case in which the brownout threshold is to be set to a value that corresponds to the effective value of the AC voltage $V_{AC}$, i.e., 72 V, the threshold amplitude $A_{BC}$ used for the brownout operation is set to a value on the order of 101 V, which is obtained by $(72\times\sqrt{2})$.

In order to prevent chattering, the threshold amplitude $A_{BO}$ is preferably configured to have hysteresis. More specifically, when the effective value of the AC voltage $V_{AC}$ becomes higher than 80 V in the brownout state after the effective value of the AC voltage $V_{AC}$ has become lower than 72 V, the state may be switched to the brown-in state. In this case, the threshold amplitude $A_{BO}$ may preferably be switched between two values on the order of 101 V and 113 V.

The AC voltage detection circuit 50 includes a comparator 51 and a logic unit 52, for example. The comparator 51 compares the second rectified voltage $V_{RECT2}$ with a predetermined threshold voltage $V_{TH}$ determined corresponding to the threshold amplitude $A_{BO}$, and generates a comparison signal S2 which indicates the comparison result. The logic unit 52 judges, based on the comparison signal S2, the magnitude relation between the amplitude $A_{AC}$ of the AC voltage $V_{AC}$ and the threshold amplitude $A_{BO}$.

Figure 3:
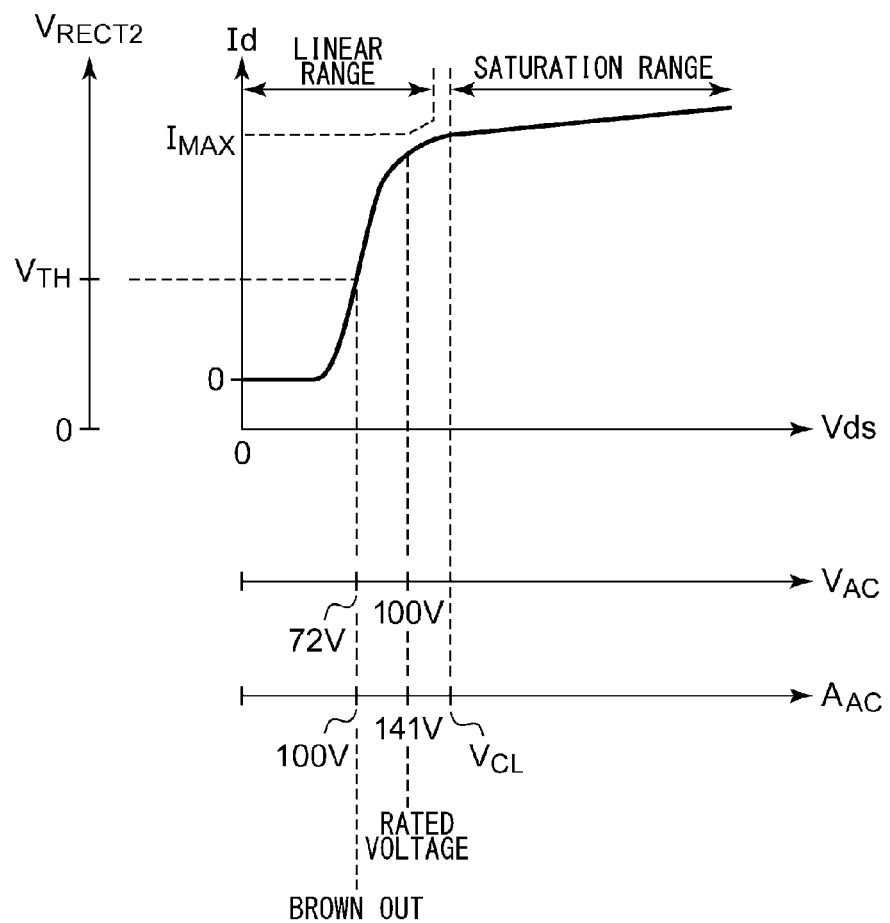
FIG. 3 is a diagram showing the current-voltage characteristics of a depletion-type NMOS transistor.

FIG. 3 is a diagram showing the current/voltage characteristics of a depletion-type NMOS transistor. The horizontal axis represents the drain-source voltage Vds, and the vertical axis represents the drain current Id. When the drain-source voltage Vds becomes large, the drain current Id is clamped in the vicinity of a predetermined maximum current value $I_{MAX}$.

When the amplitude $A_{AC}$ of the AC voltage $V_{AC}$ is within a range between the rated amplitude and the threshold amplitude $A_{BC}$ (i.e., a range between 101 V and 141 V), i.e., when the amplitude $A_{AC}$ of the AC voltage $V_{AC}$ is within the detection range, the operating point of the control circuit 10 is determined such that the first NMOS transistor MN1 operates in the linear range. Specifically, the operating point may be set according to the size of the first NMOS transistor MN1 and the resistance values of the first resistor R1 and the second resistor R2.

When the amplitude $A_{AC}$ of the AC voltage $V_{AC}$ is lower than the rated amplitude (141 V), the first NMOS transistor MN1 operates in the linear range. The drain current Id is represented by the following Expression (1) using a function $f(A_{AC})$ with the amplitude $A_{AC}$ of the AC voltage as an argument.

$$Id = f(A_{AC}) \quad (1)$$

Furthermore, the second rectified voltage $V_{RECT2}$ is represented by the following Expression (2).

$$V_{RECT2} = Id \times R2 \quad (2)$$

The following Expression (3) is derived from Expressions (1) and (2).

$$V_{RECT2} = f(A_{AC}) \times R2 \quad (3)$$

That is to say, in the linear range, there is a one-to-one correspondence between the second rectified voltage $V_{RECT2}$ and the amplitude $A_{AC}$.

The threshold voltage $V_{TH}$ is set based on the following Expression (4).

$$V_{TH} = f(A_{B0}) \times R2 \quad (4)$$

When the first NMOS transistor MN1 operates in the saturation range, the drain current Id exhibits an almost constant value $I_{MAX}$. That is to say, the drain current Id has a limit in the vicinity of the maximum current value $I_{MAX}$. When the amplitude $A_{AC}$ of the AC voltage $V_{AC}$ exceeds a voltage (which will be referred to as the "clamp voltage $V_{CL}$" hereafter) that corresponds to the boundary between the linear range and the saturation range, the voltage between both terminals of a circuit comprising the first resistor R1 and the second resistor R2, i.e., the source voltage Vs of the first NMOS transistor MN1, is clamped in the vicinity of $V_{MAX} = (R1+R2) \times I_{MAX}$.

Description will be made returning to FIG. 2. When the comparison signal S2 remains at a constant level (e.g., low level) over a predetermined number of cycles of the AC voltage $V_{AC}$, the logic unit 52 judges that $A_{AC} < A_{BC}$, and suspends the operation of the driving circuit 20.

The starter circuit 30 is arranged between the input detection terminal VIN and the VCC terminal. The starter circuit 30 includes a current path which allows the second output capacitor Co2 connected to the VCC terminal to be charged using the first rectified voltage $V_{RECT1}$ when the AC/DC converter 1 is started up. Preferably, the starter circuit 30 includes a second NMOS transistor MN2 configured as a high-voltage transistor having a breakdown voltage of 700 V, and a gate control circuit 32 which controls the on/off operation of the second NMOS transistor MN2. For example, the second NMOS transistor MN2 may be configured as a depletion-type transistor as with the first NMOS transistor MN1. Also, the second NMOS transistor MN2 may be arranged such that its source and its back gate are connected together.

The discharge transistor MN3 is arranged between the VCC terminal and the ground line. When the AC/DC converter 1 is unplugged, the discharge control unit 60 turns on the discharge transistor MN3. After the AC/DC converter 1 is unplugged, the second rectified voltage $V_{RECT2}$ becomes substantially zero. Thus, judgment of whether the AC/DC converter 1 is unplugged can be made by means of the AC voltage detection circuit 50.

The above is the configurations of the control circuit 10 and the AC/DC converter 1 including the control circuit 10. Next, description will be made regarding the operation thereof.

FIGS. 4A and 4B are operation waveform diagrams each showing the operation of the AC/DC converter 1 shown in FIG. 2. FIG. 4A shows the operation (solid line) when the amplitude $A_{AC}$ of the AC voltage $V_{AC}$ matches the rated amplitude 141 V, and the operation (the alternately long and short dashed lines) when the AC amplitude $A_{AC}$ is lower than the threshold amplitude $A_{BO}$.

When the AC voltage $V_{AC}$ is in the vicinity of the rated voltage, the first NMOS transistor MN1 operates in the linear range under the voltage/current characteristics shown in FIG. 3. In this case, the second rectified voltage $V_{RECT2}$ becomes higher than the threshold value $V_{TH}$ for each cycle of the AC voltage $V_{AC}$. Thus, the comparison signal S2 becomes high level for each cycle.

When the amplitude $A_{AC}$ of the AC voltage $V_{AC}$ becomes lower than the threshold amplitude $A_{BO}$, the amplitude of the second rectified voltage $V_{RECT2}$ becomes lower than the threshold voltage $V_{TH}$. As a result, the comparison signal S2 is maintained at the low level. When the logic unit 52 detects that the comparison signal S2 continues at the low level over a predetermined number of cycles, the logic unit 52 judges that the amplitude $A_{AC}$ of the AC voltage $V_{AC}$ is lower than the threshold amplitude $A_{BO}$. In this case, the logic unit 52 suspends the operation of the driving circuit 20.

FIG. 4B shows the operation when the amplitude $A_{AC}$ of the AC voltage $V_{AC}$ becomes very large. In a range in which the amplitude of the AC voltage $V_{AC}$ becomes large and exceeds the clamp voltage $V_{CL}$, from the voltage/current characteristics shown in FIG. 3, the drain current Id has a limit in the vicinity of the predetermined value $I_{MAX}$. In this case, the source voltage Vs of the first NMOS transistor MN1 is clamped in the vicinity of $V_{MAX} = I_{MAX} \times (R1+R2)$.

The above is the operation of the AC/DC converter 1.

With the AC/DC converter 1, the maximum current value $I_{MAX}$ can be designed according to the transistor size of the first NMOS transistor MN1. Thus, the voltage $V_{MAX}$ can be set to a desired value, e.g., a value on the order of 100 V, according to the transistor size of the first NMOS transistor MN1 and the resistance values of the resistors R1 and R2.

Such an arrangement is capable of preventing a high voltage of several hundreds of V (on the order of 700 V) from being applied to the first resistor R1 and the second resistor R2. This allows the first resistor R1 and the second resistor R2 to each be configured as an element formed on a semiconductor substrate having a breakdown voltage of 100 V. That is to say, the external resistors R11 and R22, which are required for the configuration shown in FIG. 1, may be omitted, thereby providing a reduced cost.

With such an arrangement, when the AC/DC converter 1 is unplugged, the discharge transistor MN3 is turned on. This allows the charge stored in the capacitance that occurs between the positive electrode and the negative electrode to be drawn via a path comprising the second rectifier circuit 9, the starter circuit 30, and the discharge transistor MN3. Thus, such an arrangement does not require the discharge resistor Rdis, which is required for the AC/DC converter 1r shown in FIG. 1, thereby providing a reduced cost.

Modifications of the First Embodiment

Description has been made regarding an aspect of the present invention with reference to the first embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Figure 5:
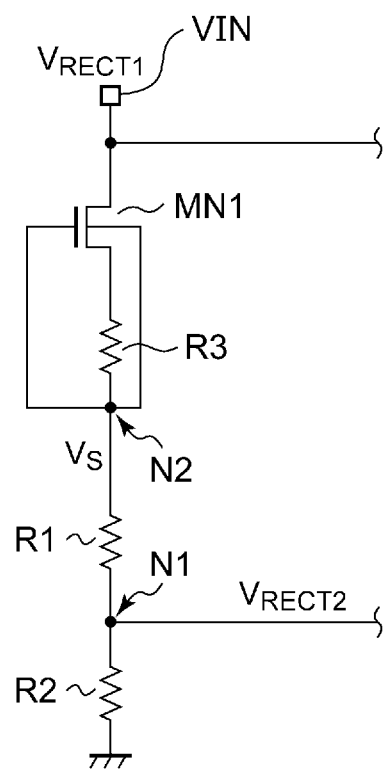
FIG. 5 is a circuit diagram showing a part of a control circuit according to a first modification.

FIG. 5 is a circuit diagram showing part of a control circuit 10a according to a first modification. The control circuit 10a further includes a third resistor R3 arranged between the source of the first NMOS transistor MN1 and the first resistor R1. Furthermore, the gate of the first NMOS transistor MN1 is connected to a connection node N2 that connects the source of the first NMOS transistor MN1 and the first resistor R1.

The current Id that flows through the first NMOS transistor MN1 not only depends on the gate-source voltage, but also depends on the temperature. With such a modification, when the current Id of the first NMOS transistor MN1 rises due to a change in the temperature, the voltage drop $V_{R3}$ across the third resistor R3 also rises. This shifts the bias voltage applied between the gate and the source of the first NMOS transistor MN1 in a direction in which the current Id becomes smaller. That is to say, the third resistor R3 allows the temperature characteristics of the first NMOS transistor MN1 to be cancelled out. Thus, such an arrangement is capable of stabilizing the source voltage Vs of the first NMOS transistor MN1.

[Second Modification]

Description has been made in the embodiment regarding an arrangement in which, in the AC voltage detection circuit 50, the threshold amplitude is set for use as a brownout threshold. However, the present invention is not restricted to such an arrangement. For example, the threshold amplitude may be set to a voltage level which is used to detect an overvoltage state in which the amplitude is higher than the rated amplitude of 141 V.

Also, the AC voltage detection circuit 50 may compare the amplitude $A_{AC}$ with multiple threshold values.

[Third Modification]

Description has been made in the embodiment regarding an arrangement in which the shunt regulator (error amplifier) 212 is arranged on the secondary side of the transformer T1. Also, such an error amplifier may be arranged on the primary side of the transformer T1. Also, such an error amplifier may be built into the control circuit 10.

[Fourth Modification]

The DC/DC converter 6 is not restricted to a step-down converter. Also, the DC/DC converter 6 may be configured as a step-up converter or a step-up/step-down converter.

Second Embodiment

Figure 6:
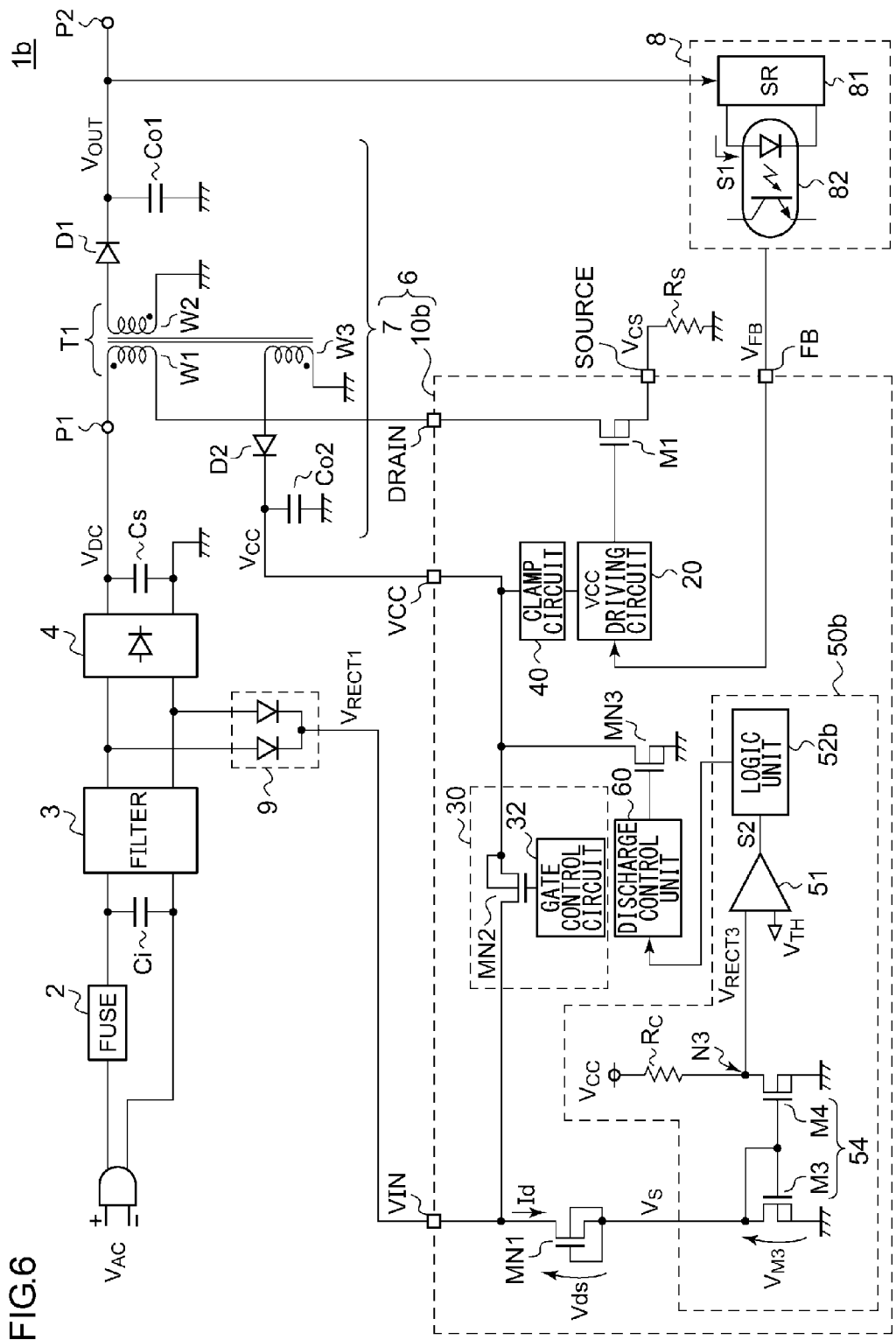
FIG. 6 is a circuit diagram showing an AC/DC converter including a control circuit according to a second embodiment.

FIG. 6 is a circuit diagram showing an AC/DC converter 1b including a control circuit 10b according to a second embodiment.

The second embodiment (the control circuit 10b shown in FIG. 6) has the following points in common with the first embodiment (control circuit 10 shown in FIG. 2). First, the first NMOS transistor MN1 configured as a depletion-type transistor is provided. Second, the amplitude $A_{AC}$ of the AC voltage $V_{AC}$ is detected based on the drain current Id of the first NMOS transistor MN1. More specifically, the current Id that flows through the first NMOS transistor MN1 is converted into a voltage $V_{RECT3}$, and the amplitude of the AC voltage is detected based on the voltage $V_{RECT3}$ thus converted. However, there is a difference between them in their configuration.

The AC voltage detection circuit 50 includes a current mirror circuit 54 and a converter resistor Rc.

The current mirror circuit 54 includes a third transistor M3 arranged between the source of the first NMOS transistor MN1 and the ground line, and a fourth transistor M4 through which flows a current Id' with a current value that is obtained by multiplying the current value of the current Id that flows through the third transistor M3 by a predetermined coefficient.

One end of the converter resistor Rc is set to a fixed electric potential. The converter resistor Rc is arranged on a path of the current Id' that flows through the fourth transistor M4. For example, one end of the converter resistor Rc is connected to the power supply line such that its electric potential is fixed to the power supply voltage $V_{CC}$.

The AC voltage detection circuit 50b detects the amplitude $A_{AC}$ of the AC voltage $V_{AC}$ based on the inverted rectified voltage $V_{RECT3}$ that occurs at the other end N3 of the converter resistor Rc.

The comparator 51 compares the inverted rectified voltage $V_{RECT3}$ with a predetermined threshold voltage $V_{TH}$, and generates a comparison signal S2 which indicates the comparison result. The logic unit 52 judges, based on the comparison signal S2, the magnitude relation between the amplitude $A_{AC}$ of the AC voltage $V_{AC}$ and the threshold amplitude $A_{BO}$ that corresponds to the threshold voltage $V_{TH}$.

Figure 7:
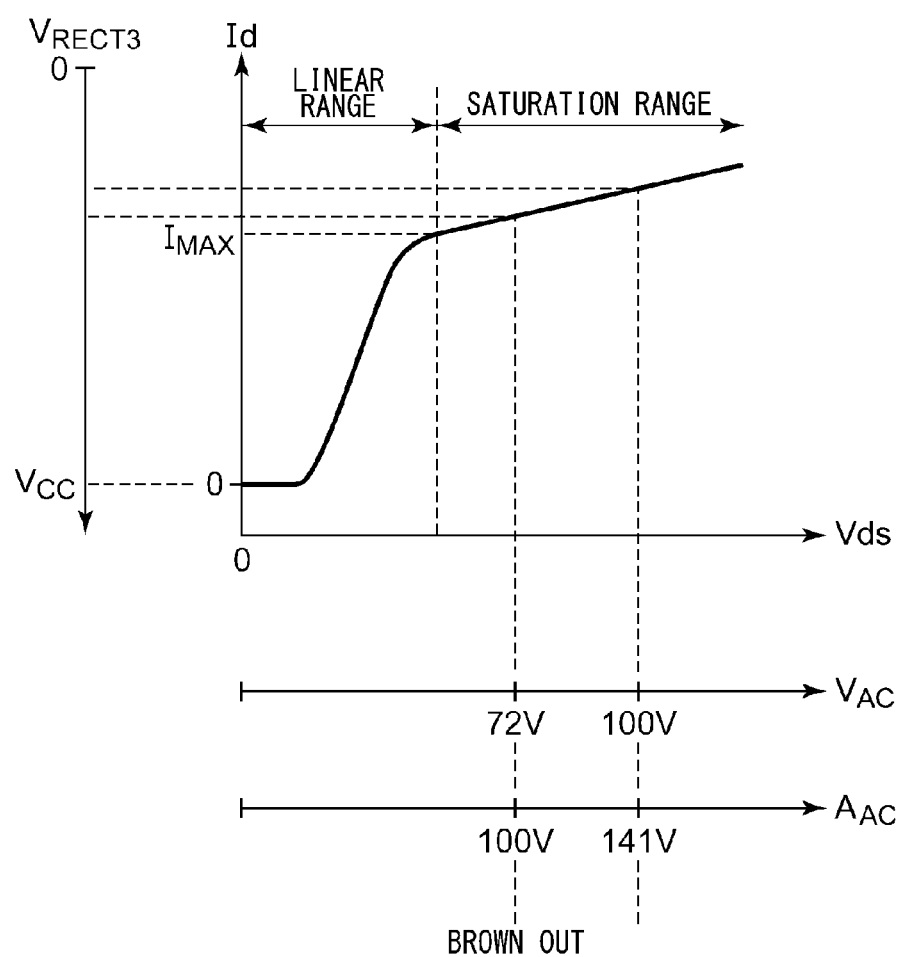
FIG. 7 is a diagram showing the current-voltage characteristics of a depletion-type NMOS transistor.

FIG. 7 is a diagram showing the current/voltage characteristics of a depletion-type NMOS transistor. The horizontal axis represents the drain-source voltage Vds, and the vertical axis represents the drain current Id. Description has been made in the first embodiment regarding an arrangement in which judgment is made using the steep voltage-current characteristics curve in the linear range. In the second embodiment, judgment is made using the gentle voltage-current characteristics curve in the saturation range.

When the amplitude $A_{AC}$ of the AC voltage $V_{AC}$ is within a range between the rated amplitude and the threshold amplitude $A_{BO}$ (i.e., when the effective value of the AC voltage $V_{AC}$ is within a range between 101 V and 141 V), i.e., when the amplitude $A_{AC}$ of the AC voltage $V_{AC}$ is within the detection range, the operating point of the control circuit 10b is determined such that the first NMOS transistor MN1 operates in the saturation range. Specifically, the operating point may be set according to the size of the first NMOS transistor MN1 and the size of the third transistor M3.

When the amplitude $A_{AC}$ of the AC voltage $V_{AC}$ is lower than the rated amplitude (141 V), the first NMOS transistor MN1 operates in the saturation range. The drain current Id is represented by the following Expression (5) using a function $g(A_{AC})$ with the amplitude $A_{AC}$ of the AC voltage as an argument.

$$Id = g(A_{AC}) \qquad (5)$$

With the mirror ratio of the current mirror circuit 54 as K, the inverted rectified voltage $V_{RECT3}$ is represented by the following Expression (6).

$$V_{RECT3} = V_{CC} - Rc \times (K \times Id) \qquad (6)$$

Here, (K×Id) represents the current that flows through the fourth transistor M4.

The following Expression (7) is derived from the Expressions (5) and (6).

$$V_{RECT2} = V_{CC} - Rc \times (K \times g(A_{AC})) \qquad (8)$$

That is to say, in the saturation range, there is a one-to-one correspondence between the inverted rectified voltage $V_{RECT3}$ and the amplitude $A_{AC}$.

Furthermore, the threshold voltage $V_{TH}$ is determined by the following Expression (9).

$$V_{TH} = V_{CC} - Rc \times (K \times g(A_{BO})) \qquad (9)$$

With the second embodiment, the drain current Id is maintained at a constant value in the vicinity of the maximum current $I_{MAX}$, regardless of the drain-source voltage Vds of the first NMOS transistor MN1. That is to say, the maximum value of the current Id that flows through the third transistor M3 is in the vicinity of the maximum current $I_{MAX}$. Thus, the drain-source voltage $V_{M3}$ of the third transistor M3 is clamped such that it is equal to or smaller than a given maximum voltage $V_{MAX}$. The third transistor M3 is designed to have a size such that the maximum voltage $V_{MAX}$ of its drain voltage $V_{M3}$ does not exceed the breakdown voltage of the third transistor M3.

Description will be made returning to FIG. 6. When the comparison signal S2 remains at a constant level (e.g., high level) over a predetermined number of cycles of the AC voltage $V_{AC}$, the logic unit 52b judges that $A_{AC} < A_{BC}$, and suspends the operation of the driving circuit 20.

The above is the configurations of the control circuit 10b and the AC/DC converter 1b including the control circuit 10b. Next, description will be made regarding the operation thereof.

Figure 8:
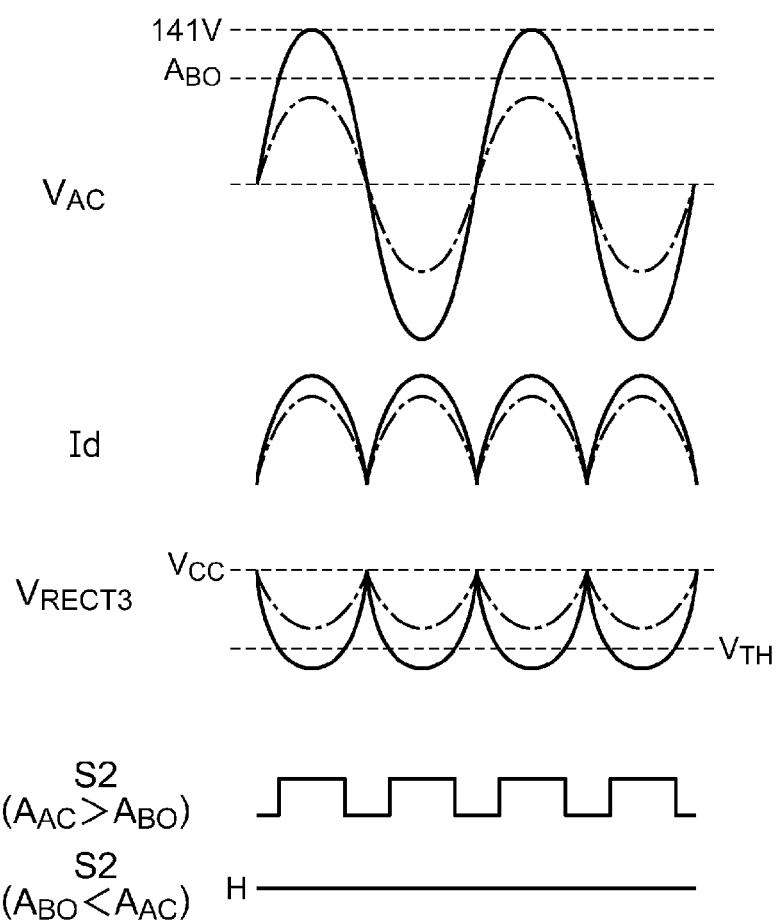
FIG. 8 is an operation waveform diagram showing the operation of the AC/DC converter shown in FIG. 6.

FIG. 8 is an operation waveform diagram showing the operation of the AC/DC converter 1b shown in FIG. 6. FIG. 8 shows the operation (solid line) when the amplitude $A_{AC}$ of the AC voltage $V_{AC}$ matches the rated amplitude 141 V, and the operation (the alternately long and short dashed lines) when the AC amplitude $A_{AC}$ is lower than the threshold amplitude $A_{BO}$.

When the AC voltage $V_{AC}$ is in the vicinity of the rated voltage, the first NMOS transistor MN1 operates in the saturation range under the voltage/current characteristics shown in FIG. 7. In this case, the inverted rectified voltage $V_{RECT3}$ becomes lower than the threshold value $V_{TH}$ for each cycle of the AC voltage $V_{AC}$. Thus, the comparison signal S2 repeatedly switches between high level and low level for each cycle.

When the amplitude $A_{AC}$ of the AC voltage $V_{AC}$ becomes lower than the threshold amplitude $A_{BO}$, the amplitude of the current Id that flows through the first NMOS transistor MN1 drops. Therefore, the inverted rectified voltage $V_{RECT3}$ becomes smaller, and continues in a state in which it is higher than the threshold voltage $V_{TH}$. In this state, the comparison signal S2 remains at high level. When the logic unit 52b detects that the comparison signal S2 has continued at the high level over a predetermined number of cycles, the logic unit 52b judges that the amplitude $A_{AC}$ of the AC voltage $V_{AC}$ is lower than the threshold amplitude $A_{BO}$. In this case, the logic unit 52b suspends the operation of the driving circuit 20.

The above is the operation of the AC/DC converter 1b.

As described above, with the AC/DC converter 1b, the maximum current value $I_{MAX}$ can be set as desired according to the size of the first NMOS transistor MN1 and the size of the third NMOS transistor M3. Thus, the maximum value of the drain voltage $V_{M3}$ of the third transistor M3 can also be designed as desired. The maximum value of the drain voltage $V_{M3}$ of the third transistor M3 is determined such that it does not exceed the breakdown voltage of the third transistor M3. Thus, such an arrangement provides the control circuit 10b with a defense against overvoltage.

Thus, the external resistors R11 and R22, which are required for the configuration shown in FIG. 1, may be omitted, thereby providing a reduced cost.

In addition, such an arrangement does not require the discharge resistor Rdis, which is required for the AC/DC converter 1r shown in FIG. 1, thereby providing a reduced cost.

Modifications of the Second Embodiment

Description has been made regarding an aspect of the present invention with reference to the second embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[Fifth Modification]

Figure 9:
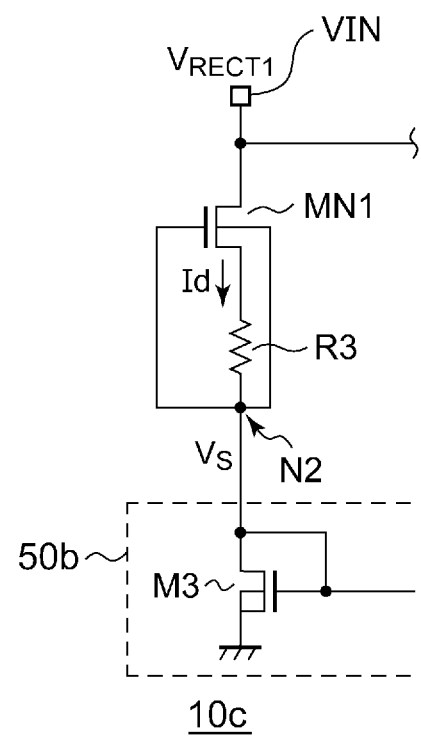
FIG. 9 is a circuit diagram showing a part of a control circuit according to a fifth modification.

FIG. 9 is a circuit diagram showing a part of a control circuit 10c according to a fifth modification. The control circuit 10c further includes a third resistor R3 arranged between the source of the first NMOS transistor MN1 and the AC voltage detection circuit 50b, and more specifically, between the source of the first NMOS transistor MN1 and the drain of the third transistor M3. Furthermore, the gate of the first NMOS transistor MN1 is connected to a connection node N2 that connects the source of the first NMOS transistor MN1 and the AC voltage detection circuit 50b.

With such a modification, the third resistor R3 allows the temperature characteristics of the first NMOS transistor MN1 to be cancelled out. Thus, such a modification is capable of stabilizing the source voltage Vs of the first NMOS transistor MN1.

[Sixth Modification]

Description has been made in the embodiment regarding an arrangement in which, in the AC voltage detection circuit 50b, the threshold amplitude is set for use as a brownout threshold. However, the present invention is not restricted to such an arrangement. For example, the threshold amplitude may be set to a voltage level which is used to detect an overvoltage state in which the amplitude is higher than the rated amplitude of 141 V.

Also, the AC voltage detection circuit 50b may compare the amplitude $A_c$ with multiple threshold values.

[Seventh Modification]

Description has been made in the embodiment regarding an arrangement in which the shunt regulator (error amplifier) 212 is arranged on the secondary side of the transformer T1. Also, such an error amplifier may be arranged on the primary side of the transformer T1. Also, such an error amplifier may be built into the control circuit 10.

[Eighth Modification]

The DC/DC converter 6 is not restricted to a step-down converter. Also, the DC/DC converter 6 may be configured as a step-up converter or a step-up/step-down converter.

[Usage]

Lastly, description will be made regarding suitable usages of the AC/DC converter 1 described in the first or otherwise second embodiment. The AC/DC converter 1 is suitably employed as a power supply block included in an AC adapter or an electronic device.

Figure 10:
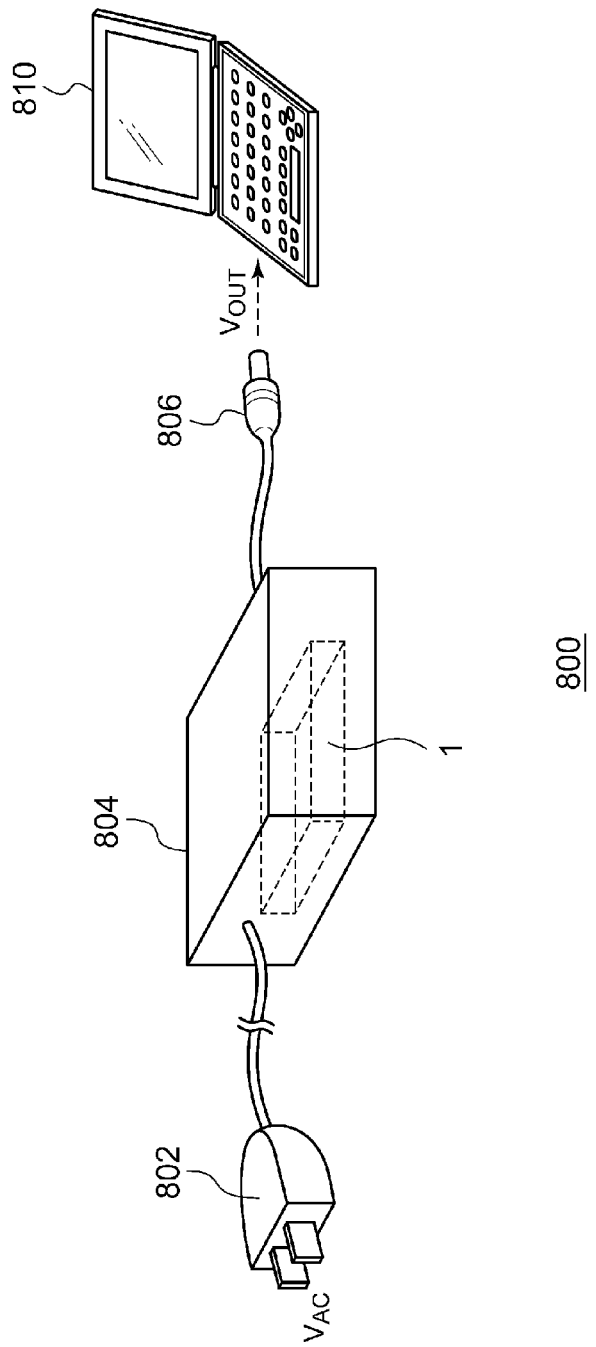
FIG. 10 is a diagram showing an AC adapter including an AC/DC converter.

FIG. 10 is a diagram showing an AC adapter 800 including the AC/DC converter. The AC adapter 800 includes a plug 802, a casing 804, and a connector 806. The plug 802 is configured to receive commercial AC voltage $V_{AC}$ from an unshown electrical outlet. The AC/DC converter is mounted within the casing 804. The DC output voltage $V_{OUT}$ generated by the AC/DC converter is supplied to an electronic device 810 via the connector 806. Examples of such an electronic device 810 include laptop PCs, digital still cameras, digital video cameras, cellular phone terminals, portable audio players, etc.

Figure 11A:
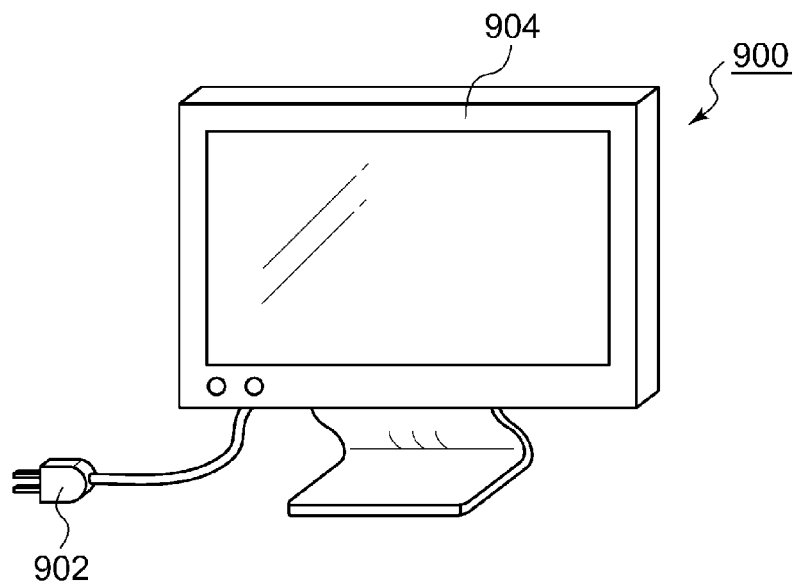
FIGS. 11A and 11B are diagrams each showing an electronic device including an AC/DC converter.
Figure 11B:
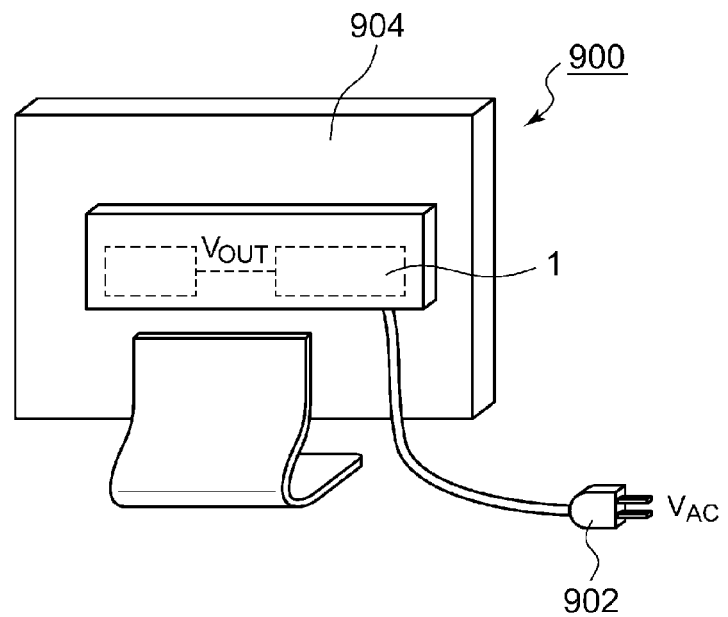

FIGS. 11A and 11B are diagrams each showing an electronic device 900 including the AC/DC converter. The electronic device 900 shown in FIGS. 11A and 11B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 is configured to receive commercial AC voltage $V_{AC}$ from an unshown electrical outlet. The AC/DC converter is mounted within the casing 804. The DC output voltage $V_{OUT}$ generated by the AC/DC converter is supplied to loads mounted within the same casing 904, examples of which include a microcomputer, DSP (Digital Signal Processor), power supply circuit, illumination device, analog circuit, digital circuit, etc.

While the preferred embodiments of the present invention have been described using specific terms, such description is for illustrative purposes only, and it is to be understood that changes and variations may be made without departing from the spirit or scope of the appended claims.

What is claimed is:

1. A control circuit used for an AC/DC converter configured to convert an AC voltage into a first DC voltage, wherein the AC/DC converter comprises:
    a first rectifier circuit configured to rectify and smooth the AC voltage so as to convert the AC voltage into a second DC voltage;
    an insulating DC/DC converter configured to step up or otherwise step down the second DC voltage; and
    a feedback circuit configured to generate a feedback voltage that corresponds to the first DC voltage,
    wherein the control circuit comprises:
        an input detection terminal coupled to receive a first rectified voltage obtained by performing full-wave rectification of the AC voltage is input;
        a power supply terminal connected to an external capacitor, and coupled to receive a third DC voltage generated on a primary side of a transformer of the DC/DC converter in an operating state of the DC/DC converter;
        a feedback terminal coupled to receive the feedback voltage;
        a depletion-type high-voltage first NMOS transistor having its drain connected to the input detection terminal and its gate connected to its source;
        an AC voltage detection circuit configured to detect an amplitude of the AC voltage based on a current that flows through the first NMOS transistor;
        a starter circuit arranged between the input detection terminal and the power supply terminal, and configured to charge the capacitor connected to the power supply terminal using the first rectified voltage in a startup operation of the AC/DC converter; and
        a driving circuit configured to receive a voltage at the power supply terminal as its operating voltage, and to drive a switching transistor of the DC/DC converter according to the feedback voltage,
    and wherein the control circuit is monolithically integrated on a single semiconductor substrate.

2. The control circuit according to claim 1, wherein the AC voltage detection circuit is configured to convert a current that flows through the first NMOS transistor into a voltage, and to detect the amplitude of the AC voltage based on the aforementioned voltage.

3. The control circuit according to claim 2, wherein the AC voltage detection circuit comprises:
    a current mirror circuit comprising a third transistor arranged between the source of the first NMOS transistor and a ground line, and a fourth transistor configured to generate a current having a current value obtained by multiplying a current that flows through the third transistor by a predetermined coefficient; and
    a converter resistor arranged on a current path of a current that flows through the fourth transistor such that its one end is set to a fixed electric potential,
    and wherein the AC voltage detection circuit is configured to detect the amplitude of the AC voltage based on an inverted rectified voltage that occurs at the other end of the converter resistor.

4. The control circuit according to claim 1, further comprising a third resistor arranged between the source of the first NMOS transistor and the AC voltage detection circuit,
    wherein the gate of the first NMOS transistor is connected to a connection node that connects the source and the AC voltage detection circuit.

5. The control circuit according to claim 1, further comprising a discharge transistor arranged between the power supply terminal and a ground line.

6. The control circuit according to claim 1, wherein the starter circuit comprises a second NMOS transistor configured as a high-voltage transistor.

7. The control circuit according to claim 6, wherein the second NMOS transistor is configured as a depletion-type transistor, and has its source and its back gate connected together.

8. The control circuit according to claim 3, wherein the AC voltage detection circuit comprises:
    a comparator configured to compare the inverted rectified voltage with a predetermined threshold voltage, and to generate a comparison signal which indicates a comparison result; and
    a logic unit configured to judge, based on the comparison signal, a magnitude relation between the amplitude of the AC voltage and a threshold amplitude that corresponds to the threshold voltage.

9. The control circuit according to claim 8, wherein, when the comparison signal remains at a constant level over a predetermined number of cycles of the AC voltage, the logic unit judges that the amplitude of the AC voltage is greater than the threshold amplitude.

10. The control circuit according to claim 1, wherein, when the amplitude of the AC voltage is smaller than the threshold amplitude, which is set to a value that is lower than a rated amplitude, the AC voltage detection circuit suspends the operation of the DC/DC converter.

11. The control circuit according to claim 3, wherein the size of the first NMOS transistor and the size of the third transistor are determined such that the first NMOS transistor operates in a saturation range when the amplitude of the AC voltage is within a detection range.

12. The control circuit according to claim 10, wherein the threshold voltage is provided with hysteresis.

13. An AC/DC converter configured to convert an AC voltage into a first DC voltage, wherein the AC/DC converter comprises: a first rectifier circuit configured to rectify and smooth the AC voltage so as to convert the AC voltage into a second DC voltage; an insulating DC/DC converter configured to step up or otherwise step down the second DC voltage; a second rectifier circuit configured to rectify the AC voltage so as to generate a first rectified voltage; a transformer comprising a primary winding and an auxiliary winding provided on its primary side, and a secondary winding provided on its secondary side; a switching transistor connected to the primary winding of the transformer; a first diode having its anode connected to the secondary winding; a first output capacitor having its one end grounded and its other end connected to a cathode of the first diode; a second diode having its anode connected to the auxiliary winding; a second output capacitor having its one end grounded, and its other end connected to a cathode of the second diode; a feedback circuit configured to generate a feedback voltage that corresponds to the first DC voltage generated at the first output capacitor; and a control circuit comprising: an input detection terminal coupled to receive a first rectified voltage obtained by performing full-wave rectification of the AC voltage is input; a power supply terminal connected to an external capacitor, and coupled to receive a third DC voltage generated on a primary side of a transformer of the DC/DC converter in an operating state of the DC/DC converter; a feedback terminal coupled to receive the feedback voltage; a depletion-type high-voltage first NMOS transistor having its drain connected to the input detection terminal and its gate connected to its source; an AC voltage detection circuit configured to detect an amplitude of the AC voltage based on a current that flows through the first NMOS transistor; a starter circuit arranged between the input detection terminal and the power supply terminal, and configured to charge the capacitor connected to the power supply terminal using the first rectified voltage in a startup operation of the AC/DC converter: and a driving circuit configured to receive a voltage at the power supply terminal as its operating voltage, and to drive a switching transistor of the DC/DC converter according to the feedback voltage, and wherein the control circuit is monolithically integrated on a single semiconductor substrate, wherein the control circuit is arranged such that the second DC voltage is input to its input detection terminal, the second DC voltage generated at the second output capacitor is supplied to its power supply terminal, and the feedback voltage is input to its feedback terminal.

14. The AC/DC converter according to claim 13, wherein the feedback circuit comprises:
a shunt regulator configured to generate a feedback signal having a level adjusted such that the difference between a voltage obtained by dividing the first DC voltage and a predetermined target value becomes zero; and
a photocoupler comprising a light-emitting element provided on its primary side, configured to be controlled according to the feedback signal,
and wherein a signal generated by a light-emitting element provided on the secondary side of the photocoupler is supplied to the control circuit as the feedback voltage.

15. The AC/DC converter according to claim 13, further comprising a filter configured to perform filtering of the AC voltage,
wherein the second rectifier circuit is configured to rectify the AC voltage after the AC voltage is subjected to the filtering.

16. An electronic device comprising:
a load; and
the AC/DC converter according to claim 13, configured to supply the first DC voltage to the load.

17. A power supply adapter comprising the AC/DC converter according to claim 13.

18. A control circuit used for an AC/DC converter configured to convert an AC voltage into a first DC voltage, wherein the AC/DC converter comprises:
a first rectifier circuit configured to rectify and smooth the AC voltage so as to convert the AC voltage into a second DC voltage;
an insulating DC/DC converter configured to step up or otherwise step down the second DC voltage; and
a feedback circuit configured to generate a feedback voltage that corresponds to the first DC voltage,
wherein the control circuit comprises:
an input detection terminal via which a first rectified voltage obtained by rectifying the AC voltage is input;
a power supply terminal connected to an external capacitor, and configured to receive a third DC voltage generated on a primary side of a transformer of the DC/DC converter in an operating state of the DC/DC converter;
a feedback terminal coupled to receive the feedback voltage;
a first NMOS transistor configured as a depletion-type high-voltage transistor having its drain connected to the input detection terminal and its gate connected to its source;
an AC voltage detection circuit comprising a first resistor and a second resistor arranged in series between the source of the first NMOS transistor and a ground line, and configured to detect the amplitude of the AC voltage based on a second rectified voltage that develops at a connection node that connects the first resistor and the second resistor;
a starter circuit arranged between the input detection terminal and the power supply terminal, and comprising a path which allows the capacitor connected to the power supply terminal to be charged using the first rectified voltage; and
a driving circuit configured to receive a voltage at the power supply terminal as its operating voltage, and to drive a switching transistor of the DC/DC converter according to the feedback voltage,
and wherein the control circuit is monolithically integrated on a single semiconductor substrate.

19. The control circuit according to claim 18, further comprising a third resistor arranged between the source of the first NMOS transistor and the first resistor,
wherein the gate of the first NMOS transistor is connected to a connection node that connects the source and the first resistor.

20. The control circuit according to claim 18, further comprising a discharge transistor arranged between the power supply terminal and the ground line.

21. The control circuit according to claim 18, wherein the starter circuit comprises a second NMOS transistor configured as a high-voltage transistor.

22. The control circuit according to claim 21, wherein the second NMOS transistor is configured as a depletion-type transistor, and has its source and its back gate connected together.

23. The control circuit according to claim 18, wherein the AC voltage detection circuit comprises:
a comparator configured to compare the second rectified voltage with a predetermined threshold voltage, and to generate a comparison signal which indicates a comparison result; and
a logic unit configured to judge a magnitude relation between the amplitude of the AC voltage and a threshold amplitude that corresponds to the threshold voltage.

24. The control circuit according to claim 23, wherein, when the comparison signal remains at a constant level over a predetermined number of cycles of the AC voltage, the logic unit judges that the amplitude of the AC voltage is smaller than the threshold amplitude.

25. The control circuit according to claim 18, wherein, when the amplitude of the AC voltage is smaller than a threshold amplitude, which is determined to be lower than its rated amplitude, the AC voltage detection circuit suspends the operation of the DC/DC converter.

26. The control circuit according to claim 25, wherein the size of the first NMOS transistor and the resistance values of the first resistor and the second resistor are determined such that the first NMOS transistor operates in a linear range when the amplitude of the AC voltage is within a detection range.

27. The control circuit according to claim 25, wherein the threshold voltage is configured to have hysteresis.

28. An AC/DC converter configured to convert an AC voltage into a first DC voltage, comprising: a first rectifier circuit configured to rectify and smooth the AC voltage so as to convert the AC voltage into a second DC voltage; an insulating DC/DC converter configured to step up or otherwise step down the second DC voltage; a second rectifier circuit configured to rectify the AC voltage so as to generate a first rectified voltage; a transformer comprising a primary winding and an auxiliary winding provided on its primary side, and a secondary winding provided on its secondary side; a switching transistor connected to the primary winding of the transformer; a first diode having its anode connected to the secondary winding; a first output capacitor having its one end grounded and its other end connected to a cathode of the first diode; a second diode having its anode connected to the auxiliary winding; a second output capacitor having its one end grounded and its other end connected to a cathode of the second diode; a feedback circuit configured to generate a feedback voltage that corresponds to the first DC voltage generated at the first output capacitor; and a control circuit comprising: an input detection terminal coupled to receive a first rectified voltage obtained by performing full-wave rectification of the AC voltage is input; a power supply terminal connected to an external capacitor, and coupled to receive a third DC voltage generated on a primary side of a transformer of the DC/DC converter in an operating state of the DC/DC converter; a feedback terminal coupled to receive the feedback voltage; a depletion-type high-voltage first NMOS transistor having its drain connected to the input detection terminal and its gate connected to its source; an AC voltage detection circuit configured to detect an amplitude of the AC voltage based on a current that flows through the first NMOS transistor; a starter circuit arranged between the input detection terminal and the power supply terminal, and configured to charge the capacitor connected to the power supply terminal using the first rectified voltage in a startup operation of the AC/DC converter: and a driving circuit configured to receive a voltage at the power supply terminal as its operating voltage, and to drive a switching transistor of the DC/DC converter according to the feedback voltage, and wherein the control circuit is monolithically integrated on a single semiconductor substrate, wherein the control circuit is arranged such that the second DC voltage is input to its input detection terminal, the second DC voltage generated at the second output capacitor is supplied to its power supply terminal, and the feedback voltage is input to its feedback terminal.

29. The AC/DC converter according to claim 28, wherein the feedback circuit comprises:
 a shunt regulator configured to generate a feedback signal having a level adjusted such that the difference between a voltage obtained by dividing the first DC voltage and a predetermined target value becomes zero; and
 a photocoupler comprising a light-emitting element provided on its primary side, configured to be controlled according to the feedback signal,
 and wherein a signal generated by a light-emitting element provided on the secondary side of the photocoupler is supplied to the control circuit as the feedback voltage.

30. The AC/DC converter according to claim 28, further comprising a filter configured to perform filtering of the AC voltage,
 wherein the second rectifier circuit is configured to rectify the AC voltage after the AC voltage is subjected to the filtering.

31. An electronic device comprising:
a load; and
 the AC/DC converter according to claim 28, configured to supply the first DC voltage to the load.

32. A power supply adapter comprising the AC/DC converter according to claim 28.

* * * * *